Nov. 14, 1967     H. CHASKIN     3,352,556
TRAJECTORY MISS INDICATOR SYSTEM
Filed Feb. 19, 1965     3 Sheets-Sheet 1
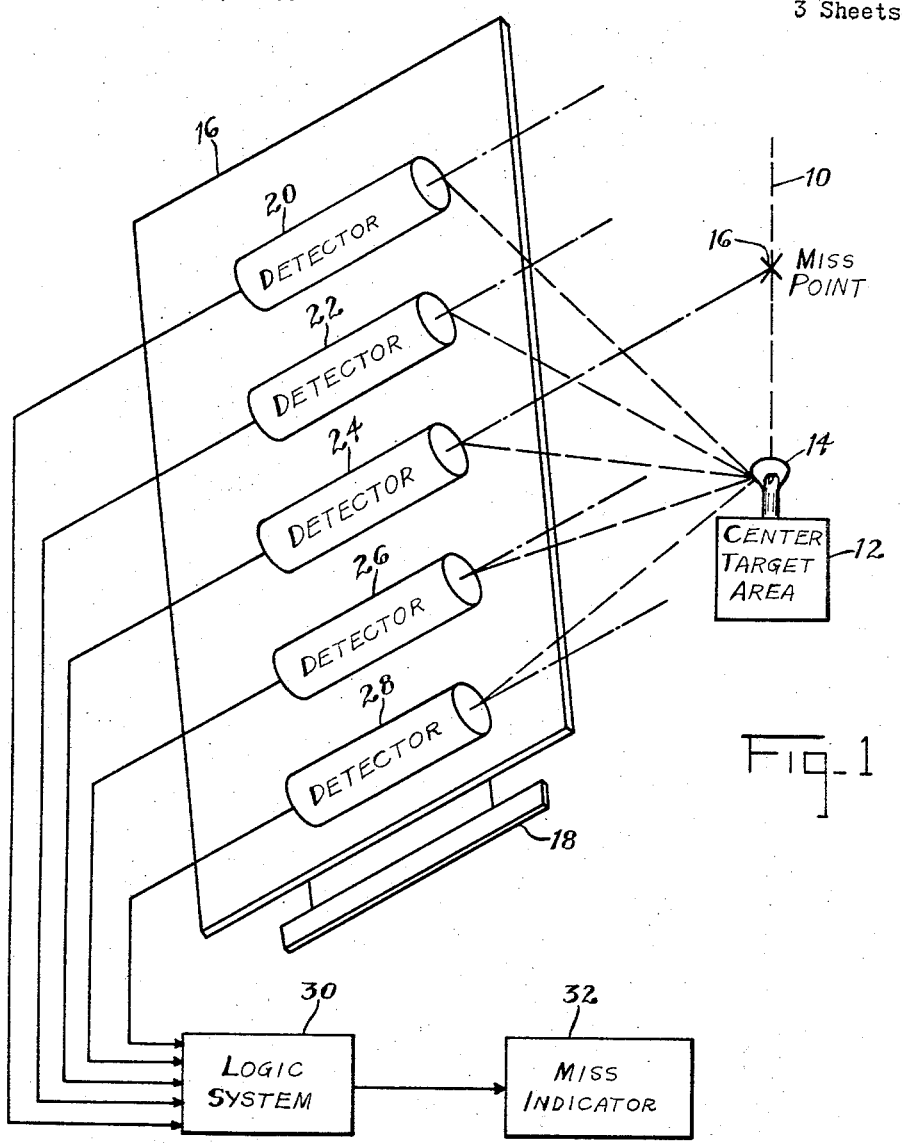
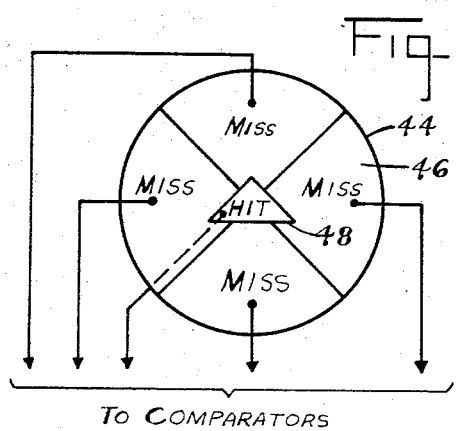
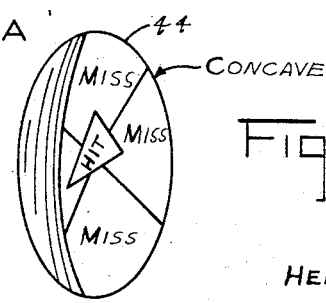
INVENTOR.
HERBERT CHASKIN
BY
Lawrence S. Epstein
ATTORNEYS

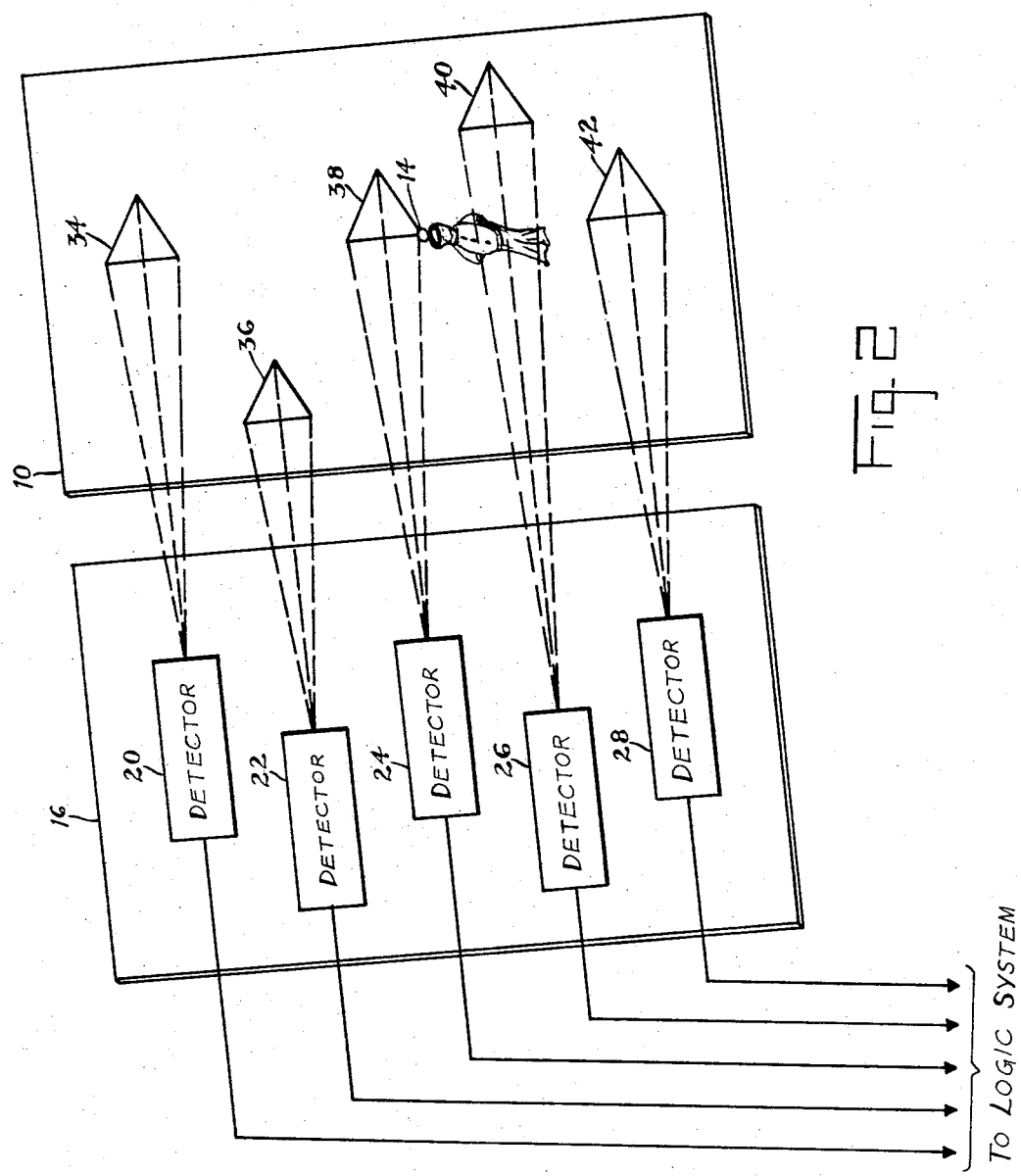

Nov. 14, 1967    H. CHASKIN    3,352,556
TRAJECTORY MISS INDICATOR SYSTEM
Filed Feb. 19, 1965    3 Sheets-Sheet 3

INVENTOR.
HERBERT CHASKIN
BY
Lawrence J Epstein
ATTORNEYS

United States Patent Office 3,352,556
Patented Nov. 14, 1967

3,352,556
TRAJECTORY MISS INDICATOR SYSTEM
Herbert Chaskin, Flushing, N.Y., assignor to the United States of America as represented by the Secretary of the Navy
Filed Feb. 19, 1965, Ser. No. 434,147
9 Claims. (Cl. 273—101.2)

ABSTRACT OF THE DISCLOSURE

A plurality of light responsive sensors are fixed at various angles to the line of sight of a simulated direct fire weapon which can be aimed and fired at a centrally lighted target. When the weapon is aimed and fired the sensors will sense the weapon-target alignment and forward a pattern of signals to a logic circuit which then furnishes the angle and magnitude of a target miss to an attached indicator.

---

This invention relates generally to weapons firing simulation and more particularly to a device for providing an accurate indication of the degree of miss resulting from an off target simulated weapon firing.

In training personnel in the agencies of war, it has often been desirable to provide a student with some satisfactory means of instruction in the aiming and positioning of a projectile ejection shaft arm device without actually causing the projectile to be emitted. In coping with this desire, a common training device employing line of sight electro-photo optics has been utilized to provide the desired indications of relative target hit or miss. Light sources, mounted on the weapon, or on the target, along with a responsive photo optical detection device have been used but rather unsuccessfully in terms of the resolution currently provided in determining off target simulated firing effects.

These and other difficulties inherent in such a system are obviated by the present invention wherein there is provided a plurality of photo responsive optical detection devices arranged about a central photo responsive optical detector. By providing proper photo optical target field patterns as well as a preset balanced output detection system, a higher degree of resolution than heretofore obtainable may be provided to indicate not only the presence of a target miss, but the angle and magnitude of such miss with relation to said target.

It is accordingly, an object of the invention to provide a system wherein an accurate determination of the angle and magnitude of miss of a target area may be determined.

It is a further object of this invention to provide a system whereby a simple and accurated etermination may be made of the degree of miss present when a simulated firing device is not aimed on target.

It is still a further object of this invention to provide an operational miss indication system wherein a plurality of photo optical detection devices may be arranged in a balanced pattern to detect the degree of miss in a simulated weapon firing system.

Other objects and many of the attendant advantages of this invention will be readily appreciated as the same becomes better understood by reference to the following detailed description when considered in connection with the accompanying drawings wherein:

FIG. 1 illustrates a block diagram of the concept employed for combining multiple photo detector outputs to attain a high degree of optical resolution;

FIG. 3 illustrates a detail of one of the photo detectors utilized in the present invention;

FIG. 4a illustrates a detail of a mosaic photo detector used in conjunction with the optical unit of the present invention; and FIG. 4b shows the same mosaic detector in orthogonal projection so as to indicate the shape of said detector.

Figure 2:
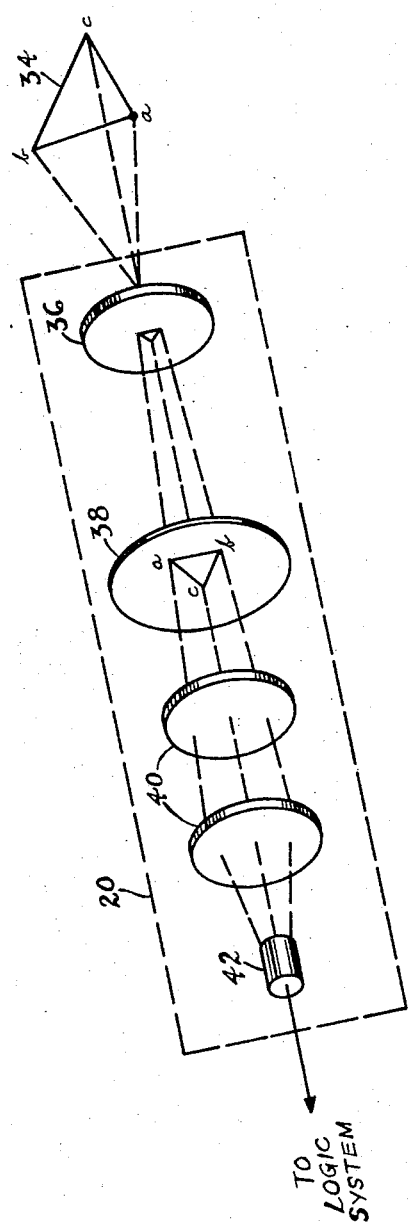
FIG. 2 illustrates the relationship between the photo optical detectors and the target area.

To determine the magnitude of miss in an off target simulated weapon firing system, a photo optical detection unit is optically linked to a target area. Since the "fringe" areas of the target area represent those areas indicative of a miss, a higher degree of resolution will be obtained by employing a plurality of "fringe" focused photo optical units so arranged as to be responsive to the angle of the impinging light generated at the target center upon a simulated firing. A preset balancing system responsive to the output of each of said photo optical devices enables a precise location of the target miss point to be determined with respect to the optical center of the vulnerable target areas.

Referring to FIG. 1, there is shown a target area 10 having a central area 12 representing the vulnerable or hit section of the target, and a light source 14 mounted on the optical center of said vulnerable area 12. A miss point 16 is located at any particular point on said target area 10. A weapon optical system 16 is mounted on a simulated weapon 18 and contains a plurality of photo optical detection units 20, 22, 24, 26 and 28 aligned within said weapon optic unit 16 and optically linked to said target area.

Light source 14 may be operated by depressing an actuatable trigger mounted on the simulated weapon 18, or may be preset to blink on and off at a predetermined rate. If desired to train personnel in centering the simulated weapon, the light source may be left on continuously.

Central detector unit 24 is aligned with the line of sight of the simulated weapon. The longitudinal axis of unit 24 will therefore always coincide with the point on the target area to which the weapon is aimed.

There are four peripheral detectors disclosed, however, it should be understood that the number of peripheral detectors may be increased or decreased depending upon the degree of resolution desired.

The amount of light impinging upon each of said detection units is dependent upon the angle formed between the longitudinal axis of each of said detectors and the target light source 14. A change in radial angular displacement between weapon optic unit 16 and vulnerable target area 12 results in a change in impinging light on each detector unit and a corresponding change in the resultant output of each of said detectors.

The outputs are fed to a logic system 30 which may comprise a series of standard amplifier and gating circuits whereby a signal representative of the displacement angle is generated. The signal is fed to a miss indicator unit 32 for display or other appropriate use. It would be entirely within the scope of this invention to utilize each photo optical detector unit of FIG. 1 independently to provide a series of separate outputs indicative of relative hit or miss quadrant positions, as well as to combine them into a single output.

Referring to FIG. 2, there is illustrated the relationship between a plurality of detector units and the target areas. Each detector unit has an optical field associated therewith which is described in more detail below in connection with FIG. 3. These fields represent predetermined areas of the simulated weapon firing optical response. Area 34 (detector unit 20) is the low miss response area, area 36 (detector unit 22) is the right miss response area, area 40 (detector unit 26) is the left miss response area, and area 42 (detector unit 28) is the high miss response area. The center or vulnerable target area 38 (detector unit 24) represents the direct hit response area.

In operation, when the weapon optic unit is positioned so as to overshoot the target center (light source 14, area 12), field response area 42 will overlie target center and the greatest amount of incident light will lie on the longitudinal axis of the high miss detector unit 28. A direct hit response is given when field response area 36 overlies the vulnerable target area so as to be directly on target light source 14.

Referring now to FIG. 3, there is disclosed a detail of a typical photo optical detector unit 20 having a projected field of view 34. Light from this field enters the detector and passes through objective lens 36 to field stop reticle 38 having thereon an apertured area defined by points a, b and c. It is this area which determines the area of the light responsive field 34. Due to the focusing of objective lens 36, the field image 34 is the inverted form of the field stop reticle 38 pattern. A pair of secondary optic lenses 40 serve to concentrate the light pattern onto a photo detector diode unit 42 thereby generating a signal output, which is passed to logic system 30 or any other appropriate indicator.

Increased resolution may be attained by substituting a mosaic detector unit for photo diode 42. As shown in FIG. 4a, the mosaic comprises a segmented disc 44 with each segment developed to detect a spot image. Each segment provides a signal to indicate miss when light impinges segments 46, and another signal indicative of a hit when light impinges on segment 48. The mosaic is designed so as to have a concave surface, shown in FIG. 4b, which is placed perpendicular to the optical axis of the system. A concave surface is used to improve the signal to noise ratio since the radiation detected at 90° is maximum but falls off in accordance with Lambert's Law of Cosines at angles less than 90°. Based on this empirical relationship, a quadrant detection of a miss can be very accurately determined by connecting each segment of the miss detector to a comparator circuit and calibrating for relative unbalances. In this manner, a single detector device as is described above, by employing one of said mosaic photo sensors, can give rise to a high degree of resolution. By providing a plurality of detectors each utilizing a mosaic, an extremely high degree of accuracy in locating miss positions may be attained.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A weapon firing simulation device comprising;
   a target,
   a selectively operable light source mounted on said target,
   a simulated weapon optically coupled to said target,
   a plurality of light response detection devices operatively coupled to said weapon and optically coupled to different sections of said target comparison means receiving data from said plurality of detection devices which are optically coupled to different sections of said target, whereby the relative magnitude of miss between the line of sight of said weapon and the vulnerable area of said target is determined.

2. The combination of claim 1, wherein each detector device signal is weighed to determine the relative magnitude of miss.

3. In a weapon firing simulation device, the combination comprising;
   a target having a predetermined vulnerable area,
   a selectively operable light source mounted on said target,
   a light responsive hit detector optically coupled to said target whereby a direct hit on the vulnerable area of said target may be indicated,
   a plurality of light responsive miss detectors optically coupled to said target and comparison means receiving data from said plurality of miss detectors whereby a target miss may be indicated.

4. In a weapon firing simulation device, the combination comprising;
   a target having a plurality of predetermined areas,
   a selectively operable light source mounted on one of said areas,
   a simulated weapon selectively triggering said light source, upon a line of sight coincidence between said simulated weapon and one of said target areas,
   a plurality of light responsive detecting devices each optically coupled to said light source and comparison means receiving data from said plurality of detection devices whereby an indication of the angular relationship between the simulated weapon line of sight and the target area is provided.

5. In a weapon firing simulation device, the combination comprising;
   a target having an inner area and a plurality of predetermined outer areas,
   a selectively operable light source mounted at the optical center of the said inner area,
   a triggering device selectively coupled to said light source whereby said light source is operated upon a line of sight coincidence between said triggering device and one of said target areas,
   a single light responsive detecting device optically coupled to the said target inner area whereby a direct hit on said target may be selectively indicated,
   a plurality of light responsive detecting devices arranged about said single light responsive detecting device and each optically coupled to respective ones of said predetermined outer target areas, and comparison means receiving data from said plurality of light responsive detection devices whereby an indication of the relative miss of the said target inner area may be selectively determined.

6. The combination of claim 5 wherein said triggering device comprises;
   a simulated weapon having an actuable trigger.

7. The combination of claim 5 wherein said light responsive detecting devices comprise;
   a telescopic chamber,
   a detector responsive to radiant energy, said detector being located at the eye piece of said telescopic chamber, and
   an apertured field stop reticle mounted along the optical axis of said telescopic screen, whereby the predetermined target area configuration is determined.

8. The combination of claim 5 wherein said comparison means comprise logic means operatively coupled to the outputs of each of said light responsive detection devices and indicator means operatively connected to said logic means to indicate the relative mangitude and angle of a target miss.

9. In a miss detection device for use with a weapon simulator, the combination comprising;
   a target having an inner area and a plurality of outer areas,
   a selectively operable light source mounted on the inner area of said target,
   a multi-segmented mosaic photo detection device having a plurality of photo responsive segments optically coupled to each of said target areas, and
   means operatively coupled to each of said photo responsive segments whereby the degree of unbalance between the amount of light impinging on each of said segments may be determined.

(References on following page)

References Cited

UNITED STATES PATENTS

| | | | |
|---|---|---|---|
| 1,954,509 | 4/1934 | Yates | 273—101.2 |
| 3,083,474 | 4/1963 | Knapp | 35—25 |
| 3,104,478 | 9/1963 | Strauss et al. | |

FOREIGN PATENTS 1,170,883  5/1964  Germany.

ANTON O. OECHSLE, *Primary Examiner.*

M. R. PAGE, *Assistant Examiner.*